US008280609B2

(12) United States Patent
Ehlert

(10) Patent No.: US 8,280,609 B2

(45) **Date of Patent: *Oct. 2, 2012**

(54) METHOD AND DEVICE FOR GLOWPLUG IGNITION CONTROL

(75) Inventor: Ralf Ehlert, Stuttgart (DE)

(73) Assignee: BERU Aktiengesellschaft, Ludwigsburg (DE)

( * ) Notice: Subject to any disclaimer, the term of this patent is extended or adjusted under 35 U.S.C. 154(b) by 408 days.

This patent is subject to a terminal disclaimer.

(21) Appl. No.: 12/529,992

(22) PCT Filed: Mar. 7, 2008

(86) PCT No.: PCT/DE2008/000395

§ 371 (c)(1),
(2), (4) Date: Dec. 2, 2009

(87) PCT Pub. No.: WO2008/110143

PCT Pub. Date: Sep. 18, 2008

(65) Prior Publication Data

US 2010/0094524 A1 Apr. 15, 2010

(30) Foreign Application Priority Data

Mar. 9, 2007 (DE) ........................ 10 2007 011 977

(51) Int. Cl.
*G06F 19/00* (2011.01)
*F02P 19/02* (2006.01)

(52) U.S. Cl. .................................... 701/102; 123/145 A

(58) Field of Classification Search .................. 701/102, 701/105, 113, 115; 123/145 A, 145 R, 179.6, 123/179.21, 623; 219/270, 544; 73/114.62; 361/264–266

See application file for complete search history.

(56) References Cited

U.S. PATENT DOCUMENTS

| | | | | |
|---|---|---|---|---|
| 4,607,153 | A * | 8/1986 | Ang et al. | 219/497 |
| 4,658,772 | A | 4/1987 | Auth et al. | |
| 4,669,430 | A * | 6/1987 | Reinold et al. | 123/179.6 |
| 5,469,819 | A | 11/1995 | Berger et al. | |
| 5,570,666 | A * | 11/1996 | Rymut et al. | 123/145 A |
| 6,148,258 | A * | 11/2000 | Boisvert et al. | 701/99 |
| 6,635,851 | B2 | 10/2003 | Uhl | |
| 6,712,032 | B2 | 3/2004 | Uhl et al. | |
| 6,843,218 | B2 | 1/2005 | Kumada et al. | |
| 7,002,106 | B2 * | 2/2006 | Toedter et al. | 219/270 |
| 7,234,430 | B2 | 6/2007 | Toedter et al. | |
| 7,500,457 | B2 * | 3/2009 | Hiramatsu | 123/145 A |
| 2008/0163840 | A1 * | 7/2008 | Toedter et al. | 123/145 A |
| 2010/0094523 | A1 * | 4/2010 | Kernwein et al. | 701/102 |

FOREIGN PATENT DOCUMENTS

WO WO 2007/033825 A1 3/2007

OTHER PUBLICATIONS

MTZ Motortechnische Zeitschrift 61 (2000) 10.

* cited by examiner

*Primary Examiner* — John T. Kwon
*Assistant Examiner* — Johnny Hoang

(57) ABSTRACT

A device for glow plug excitation control is disclosed, in particular for a glow system (2) for controlling at least one glow plug pencil (3), in particular for the rapid heating with an engine control device (1), comprising at least an engine control (1), a glow system (2), a glow plug (3), a supply resistance terminal 30 (4), a supply resistance glow plug (5), an internal resistance glow control (6), a measured voltage at the engine control U1 (7), a voltage drop on the lead to glow control device U2 (8), a voltage drop in the glow control device U3 (9), a voltage drop at the lead to glow plug U4 (10), a voltage at the glow plug U5 (11).

11 Claims, 1 Drawing Sheet

METHOD AND DEVICE FOR GLOWPLUG IGNITION CONTROL

The invention relates to a method and a device for glow plug excitation control, in particular with the so-called rapid heating or the co-called key start.

There are glow plugs known which have a self regulating heating-up characteristic. These are switched time-controlled to a supply voltage and heat up to the predetermined operating temperature due to their self-regulating behaviour.

From U.S. Pat. No. 4,658,772, a method for heating a glow plug is known, in which the glow plug is heated to the ignition temperature from the cold state of the combustion engine and the filament current is then not switched off as usual but, depending on different operational machine parameters particularly the fuel supply, i.e. it is maintained controlled depending on the engine in order to keep the temperature of the glow plug in this so-called post-heating phase at a certain value or at least in a specific temperature range.

With a method known from U.S. Pat. No. 5,469,819 for controlling the heating of a glow plug during the pre-heating phase, the required pre-heating time is determined depending on the engine water temperature and the pre-heating is switched via one relay, wherein one max. pre-heating time is given that is not exceeded even with low coolant temperatures. This is an example of a method in which the glow plug is switched time-controlled to the supply circuit.

Electronically controlled glow systems for diesel engines are known. Such a glow system comprises an electronic glow plug control unit and performance-optimised glow plugs. These plugs have a heat-up time of only 2 seconds, as compared to 5 seconds with the glow plugs with self-regulating heating-up characteristic.

In the control device, power semiconductors that replace the formerly used electromechanical relays are used as switches for controlling the glow plugs. Each glow plug is controlled individually. Temperature behaviour and power consumption in the electronically controlled glow plug are not determined by the internal structure of the glow plug as with the self-regulating SRS, but rather adjusted by the control device in a broad range to the glow requirement of the engine. The power consumption is adjusted by clocking (pulse width—modulation) of the glow plug power using a power semiconductor. The efficiency of the system is so high, that hardly more than the power required by the glow plug is taken from the on-board power supply. Since in the ISS every glow plug is controlled by a separate power semiconductor, the current can be monitored separately in every glow plug circuit. This then makes possible an individual diagnosis at every plug. Depth and scope of the diagnosis are designed according to the requirements of the engine manufacturer. The demands for the glow system and the resulting functions require a communication of the glow system with the engine control that far exceeds the previous switching on or off of the glow plugs. The different glow plug demands are to be transferred, besides diagnosis and status information. In some applications, the power consumed by the glow system is reported back to a power management system. The so-called ISS glow plug reaches a temperature of more than one thousand degrees Celsius in about two seconds, whereby they require a lesser power consumption.

Such methods and devices are known, e.g. from glow systems in which the logics are integrated in the engine control, a glow demands is sent from the engine control device in the form of a PWM demand signal to the glow system and the controlling of the glow plugs takes place in it.

Unfavourable in this is that the voltage drop on the lead from the glow control device to the glow plugs and, where applicable, in the glow control device is not taken into consideration in the engine control. An energy input to the glow plugs that is too low is then made for the pre-heating, in particular with too low on-board voltage and brings about a worsened start, attributable to too low glow plug end temperatures.

SUMMARY OF THE INVENTION

It is an object of the invention to prevent the aforementioned disadvantages in particular during the pre-heating process and to create a device or method that compensates for the possibly too low voltage on the glow plug with suitable measures.

The object of the invention is especially solved with a method according to claim 1, or a device according to claim 4. Thereby the undervoltages possibly present on the glow plugs when the on-board voltage is too low are compensated for by extending the preheating time and thus an improved engine start achieved; the system-specific voltage drop between engine control, glow system and glow plug is alternatively, with sufficient on-board voltage, corrected for just that voltage drop. Furthermore, the voltage drops within the glow plug control system are determined, empirically or mathematically, and taken into consideration during operation for the controlling of the glow plugs in the manner that e.g. 11 V are constantly applied to the glow plug. Advantageous in the invention is the fact that it enables a normal start with preheating and a key start even with on-board voltages below 12 V in extremely low temperatures or with weak battery or too much on-board power supply load.

BRIEF DESCRIPTION OF THE DRAWINGS

The advantages and features of the present invention will be better understood by the following description when considered in conjunction with the accompanying drawings in which.

DETAILED DESCRIPTION

Figure 1:
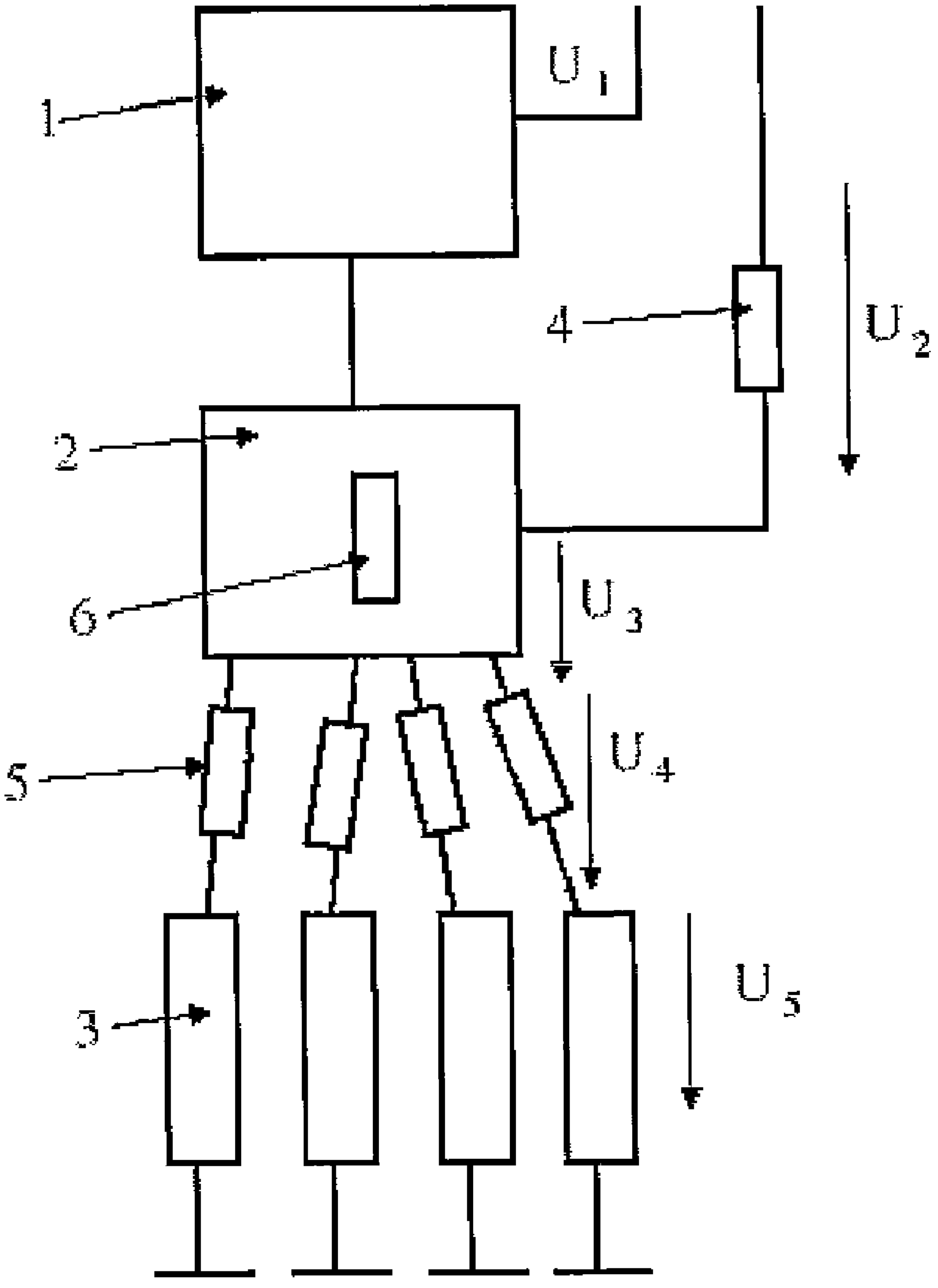
FIG. 1 shows a schematic of the glow plug control device with the illustration of the lead resistances and voltage drops.

The engine control 1 shown in FIG. 1 communicates by means of a bidirectional connection with the glow system or rather the glow plug control device 2. The glow system or rather the glow plug control device 2 comprises a microprocessor for the controlling of all functions, MOSFET power semiconductors to switch on and off the individual glow plugs, an electrical interface for the communication with the engine control and an internal power supply for the microprocessor and the interface. The microprocessor controls the power semiconductors, reads their status information and communicates with the engine control via the electrical interface. The power semiconductors are so-called high side switches with integrated controlling and protection functions such as a charge pump, a current limitation and overtemperature switch-off.

The gate voltage required for controlling the actual switching transistor is generated with the charge pump. Status information such as open or closed load circuit and activated overtemperature switch-off are available as output signal. In order to not disturb the EMC by clocking the high glow plug currents with frequencies from 30 to 100 Hz, an edge control is integrated in the power semiconductors. This prevents changes in voltage or power that are too rapid which could lead to faults of the EMC in the load circuit. The interface adjusts the signals that are required for communication between engine control and microprocessor. The signal supply delivers a steady voltage for the microprocessor and the interface. The glow plug control device 2 is preferably attached directly to the engine. It is hereby favourable that the high current wire connections for the connections to the glow plugs and the on-board power supply are short.

This results in high requirements for the mechanical stability of the control device and the electrical assembly and joining technique. To connect the control device 2 there is a two-part plug-in system for the on-board power supply connection—the terminal 30—and the other connections. The rapid heating of the glow plugs in the pre-heating phase takes place energy-controlled. This ensures that the glow plugs reach their target temperature as quickly as possible without overheating. In the following controlling intervals, the voltage on the glow plugs is reduced step by step, by which means a temperature-time profile of the glow plugs is set specifically that is adjusted to the requirements of the engine. A usual heating curve of an ISS glow plug reveals that after reaching the pre-heating temperature, the voltage demand of the glow plug 3 is—at about 5 Volt—clearly below the available on-board voltage. The sharp decline of the on-board voltage during the starting process has only little influence on the glow plug temperature. The reduction of the voltage on the glow plug by the pulse width modulation leads to the on-board voltage not being permanently applied to the glow plug but instead being intermittently applied for a specific switch-on time.

In order to maintain the effective voltage on the glow plugs within the individual controlling intervals, fluctuations in the on-board voltage are compensated by changing the switch-on time. The simultaneous intermittent switching on and off of all glow plugs would lead, depending on the number of cylinders of the engine, to a more or less high intermittent, erratic power load of the on-board power supply. This is prevented by a power optimisation, that means through a sequential switching on of the glow plugs, which minimised the occurring power surges. The algorithm of the power optimisation attempts to switch on the glow plugs successively if possible. In the most favourable case the on-board power supply will then be charged evenly with the power of a glow plug. In the standard case, the power load of the on-board power supply will fluctuate by the power of one glow plug. A repeat start detection prevents an overheating of the glow plug if several pre-heating actions are to be triggered in short succession. Depending on the engine speed and engine load, the glow plugs are cooled of at differing degrees. In order to maintain the glow plug temperature despite that, the power fed to the glow plugs is adjusted to the changing conditions.

This is done according to the specifications from the engine control device by raising or lowering the glow plug voltage. The individual control of the glow plugs with power semiconductors enables comprehensive selective diagnosis and protection functions. An overcurrent detection interrupts the affected glow plug circuit when load currents are too high, for instance as a result of a short circuit. The overtemperature switch-off integrated in the power semiconductors prevents a destruction of the semiconductor switch, if the semiconductor temperature reaches inadmissibly high values through self-heating or ambient temperatures that are too high. An open load circuit is also detected. This status information can be communicated as well as the electrical load of the engine control received by the glow system.

The engine control device determines based on the given parameters such as e.g. the coolant temperature, the ambient temperature, the engine status, or the on-board voltage a value for the amount of energy to be entered into the glow plugs in the form of a PWM requirement. The glow control device converts this glow demand into a PWM control signal and accordingly controls the individual glow plugs time-displaced. Since glow plugs are usually designed for a heating operation with a specific on-board voltage, e.g. 12 V, the pulse width is converted according to the actual voltage on terminal 30 of the glow control device with a requirement that is related to a higher on-board voltage and the glow plugs 3 are selected with the according pulse widths. If the on-board power supply is so low that the voltage required for the rapid heating, including the voltage drop U4 to be corrected and the voltage drop U2, is not available, then the required amount of energy can possibly not be input into the glow plug.

The heating of the glow plug takes place energy-controlled, in that the heating energy required for heating to the predetermined temperature is determined from the parameters of the respective glow plug type in its given arrangement and the starting temperature of the glow plug and is fed to the glow plug within a selected heating interval. It is assumed hereby that the same heating energy is always required with familiar initial conditions to heat a glow plug of the same glow plug type to the desired end temperature, that means the specified temperature. These initial conditions are the starting temperature, the cooling conditions, the heat capacity of the glow plug area to be heated, which is a delimited area of the glow plug, i.e. the glow tube and above all the tip of the glow plug, and the system-related voltage drops between engine control, glow system and glow plug. The cooling conditions are specified by the arrangement or the installation of the glow plug in the engine and can be determined through calculation or through measurement. The heat capacity of the glow plug, in particular that of its area to be heated at the tip of the glow plug, is determined by the geometry and by the material properties and it can likewise be determined through calculation or through measurement.

It can be assumed hereby that with regard to the manufacture of glow plugs in high numbers the cooling conditions, the heat capacity of glow plugs of the same glow plug type and the system-related voltage drops between engine control, glow system and glow plug in vehicles of the same type are subject to small variations only. That implies that that energy required for heating a glow plug from the starting temperature to the intended or predetermined end temperature can be determined through measurement and/or through calculation depending on the aforementioned system parameters and that in glow plugs of the same glow plug type in the arrangement in the same vehicle type, that the heating can be controlled in such a manner that always the same predetermined heating energy, which is required for heating the glow plug to the predetermined temperature and determined through measurement or calculation or with a combination of measurement and calculation, is fed during the heating phase. Other starting or end temperatures can be assigned other required heating.

If the heating energy supply is controlled electronically, then the supply of heating energy can be controlled as per unit of time, the consumption of the electrical energy at will. For instance, the power consumption can be kept at a constant level or initially more power and then less can be fed, or the other way around, at first less and then more power. In an observation period T1, the heating energy received by the glow plug (GP) can be determined from the product of the glow plug power U(GP) applied during the partial time interval T1, the applied glow plug power I(GP) and the time span T1. The overall heating energy fed to a glow plug is calculated from the addition of the individual heating energy fed during the respective partial time intervals. The heating energy supply can be controlled in that the overall heating time interval is divided into individual partial time intervals. The partial heating quantity actually fed to the glow plug in the respective partial time intervals is determined and added, until the overall heating energy is reached that is required depending on the system parameters, that is necessary for heating the glow plug to the predetermined temperature.

Glow plugs are designed for a heating operation with a specific on-board voltage, e.g. 12 V, the pulse width is converted to a 11 V operation according to the actual voltage on terminal 30 of the glow control device with a requirement that is related to a higher on-board voltage and the glow plugs are selected accordingly with extended pulse widths. If the voltage on the engine control device differs so greatly from the voltage on the glow plug control device due to the voltage drop U2, that the 11 V cannot be reached on the glow plug control device, then the difference in voltage can no longer be compensated for.

During the pre-heating process this leads to a pre-heating time that is, for the actual glow plug voltage, too short and thus to an end temperature that is too low.

It is therefore suggested to create a characteristic diagram that, for a specific vehicle type (installation situation, line lengths, number of interconnected consumers or plugs), takes already in the engine control device the voltage drop into consideration when voltages are below the target operational voltage and accordingly already provides the engine control device with a corrected glow requirement to the glow plug control device.

In a favourable embodiment, a system-specific defined value for the voltage drop delta U (depending on vehicle type, cable length, cross-section) is deducted from the measured voltage U1. For more precise adjustment though, the correction voltage can be stored in a characteristic diagram with different and empirically determined values depending also on the glow plug power and/or the glow plug voltage and/or the on-board voltage and/or the coolant temperature.

The required end or steady-state temperature will be achieved on the glow plug even with unfavourable conditions by correcting the voltage in the engine control device.

In another embodiment, this characteristic diagram can also be taken into consideration through according measures in the glow plug control device so that this will make the adjustment for the controlling.

An alternative embodiment provides for the voltage actually applied to the glow plug 3 to be measured and reported to the control device 1. In the engine control device 1 it is now determined whether the measured voltage value on glow plug 3 is less than the required 11 volt. If the measured voltage is less than 11 volt, then the engine control 1 will determine the present battery voltage. If the determined battery voltage is, for instance, higher than 12.1 volt, then the voltage to be fed to glow plug 3 by the engine control 1 or in cooperation with the glow system 2 is adjusted in such a way that the required 11 volt are applied to the glow plug 3 and the system-related line losses are thus compensated for. But if the existing battery voltage is below 12.1 volt, then the engine control and/or the glow system 2 must, likewise with consideration to the existing voltage drops, input the amount of energy required for successful start of the diesel engine, that heats the glow plug to about 1100 degrees Celsius, in timed intervals, which as a result will lead to an extension of the reaching of the steady-state temperature. The compensation of line losses to the glow plug control device considering a voltage drop for the calculation of the heating time is advantageous. Another advantage is the storing of a characteristic diagram in the engine control device for the correction of the on-board voltage measured there, in particular depending on the voltage drops inherent in the system, which is used as a basis for the calculation of the time for the rapid heating of the glow plugs. Another advantage is the storing of one above described characteristic diagram in the glow plug control device to correct the glow plug controlling.

LIST OF REFERENCE NUMERALS

1. Engine control
2. Glow system
3. Glow plugs
4. Supply resistance, terminal 30
5. Supply resistance, glow plug
6. internal resistance, glow control
7. U1 measured voltage on the engine control
8. U2 voltage drop on lead to glow control device
9. U3 voltage drop in the glow control device
10. U4 voltage drop on the lead to the glow plug
11. U5 voltage on the glow plug

What is claimed is:

1. Method for heating-up a glow plug of a given type in a combustion engine to a predetermined operating temperature by pulse width modulation of a supply voltage so that the supply voltage is applied to the glow plug during switch-on time, wherein a heating energy required to heat the glow plug to the predetermined operating temperature is determined from parameters of a respective glow plug type and a starting temperature, the heating energy is fed to the glow plug in a selected heating interval and a system-specific value of a voltage drop depending on cable length and cross-section is subtracted from a measured value of the supply voltage and the result used to calculate the amount of heating energy fed to the glow plug during switch-on time.

2. Method according to claim 1, wherein the supply voltage is measured and fluctuations in the supply voltage are compensated by changing the switch-on time.

3. Method according to claim 1, wherein line losses causing a voltage drop are compensated by changing the switch-on time.

4. Method according to claim 1, wherein an engine control device provides a glow requirement to a glow plug control device, whereby the glow requirement is corrected for line losses due to supply voltage and glow plug internal resistance.

5. Method according to claim 4, wherein the required heating energy is determined by the glow plug device.

6. Method according to claim 1, wherein several glow plugs of an engine are heated up to the predetermined operating temperature by sequential switching on.

7. Method according to claim 1, wherein the parameters of the glow plug type include the heat capacity of the glow plug area to be heated.

8. Method according to claim 1, wherein the parameters of the glow plug type include the cooling conditions.

9. Method according to claim 1, wherein the heating energy required to heating the glow plug to the predetermined operating temperature is determined by taking system related-voltage drops into account.

10. Method for heating-up a glow plug of a given type in a combustion engine to a predetermined operating temperature by pulse width modulation of a supply voltage so that the supply voltage is applied to the glow plug during switch-on time, wherein a heating energy required to heat the glow plug to the predetermined operating temperature is determined from parameters of a respective glow plug type and a starting temperature, and;

the heating energy is fed to the glow plug in a selected heating interval and wherein a stored characteristic diagram is used to correct a measured supply voltage for line losses when the amount of heating energy fed to the glow plug during switch-on time is calculated, said time losses being due to supply voltage and glow plug internal resistance.

11. Method for heating-up a glow plug of a given type in a combustion engine to a predetermined operating temperature by pulse width modulation of a supply voltage so that the supply voltage is applied to the glow plug during switch-on time, wherein a heating energy required to heat the glow plug to the predetermined operating temperature is determined from parameters of a respective glow plug type and a starting temperature, and the heating energy is fed to the glow plug in a selected heating interval and wherein power semiconductors having an integrated edge control are used for switching the supply voltage on and off.

* * * * *